(12) United States Patent
Honda et al.

(10) Patent No.: US 7,413,780 B2
(45) Date of Patent: Aug. 19, 2008

(54) HIGH STRENGTH GALVANNEALED STEEL SHEET EXCELLENT IN WORKABILITY AND A METHOD OF PRODUCTION OF THE SAME

(75) Inventors: Kazuhiko Honda, Kimitsu (JP); Masaharu Kameda, Kimitsu (JP); Yasuharu Sakuma, Kimitsu (JP); Akio Saito, Tokyo (JP); Tetsuo Nishiyama, Kimitsu (JP); Atsushi Itami, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 102 days.

(21) Appl. No.: 10/540,589

(22) PCT Filed: Dec. 26, 2002

(86) PCT No.: PCT/JP02/13712

§ 371 (c)(1), (2), (4) Date: Mar. 7, 2006

(87) PCT Pub. No.: WO2004/061137

PCT Pub. Date: Jul. 22, 2004

(65) Prior Publication Data

US 2006/0222882 A1    Oct. 5, 2006

(51) Int. Cl.
*B21B 27/00* (2006.01)
*B21B 27/06* (2006.01)
*C22C 38/00* (2006.01)
*B05D 1/18* (2006.01)

(52) U.S. Cl. .................... 427/433; 148/320; 72/199; 72/200; 72/201; 29/17.2

(58) Field of Classification Search .................. 148/320, 148/328, 337; 427/433; 72/199, 200, 201; 29/17.2
See application file for complete search history.

(56) References Cited

U.S. PATENT DOCUMENTS 6,306,527 B1 * 10/2001 Ikeda et al. ................. 428/659

FOREIGN PATENT DOCUMENTS

| EP | 1 160 346 | | 12/2001 |
|----|-----------|---|---------|
| JP | 11-279691 | * | 10/1999 |
| JP | 2001-140022 | * | 5/2001 |
| WO | WO 02/055751 | | 7/2002 |

* cited by examiner

*Primary Examiner*—Michael La Villa
(74) *Attorney, Agent, or Firm*—Kenyon & Kenyon LLP

(57) ABSTRACT

Galvannealed steel sheet simultaneously able to achieve excellent workability and high strength and a method of production of the same are provided as an objective, in particular high strength galvannealed steel sheet excellent in workability, comprising high strength steel sheet containing, by mass %, C: 0.05 to 0.15%, Si: 0.3 to 2.0%, Mn: 1.0 to 2.8%, P: 0.03% or less, S: 0.02% or less, Al: 0.005 to 0.5%, and N: 0.0060% or less and a balance of Fe and unavoidable impurities, where, when % C, % Si, and % Mn respectively represent the C, Si, and Mn contents, (% Mn)/(% C)≧12 and (% Si)/(% C)≧4 being satisfied, on the surface of which having a galvannealed layer containing Al: 0.05 to 0.5 mass % and Fe: 5 to 15 mass % and a balance of Zn and unavoidable impurities, said steel sheet satisfying a relationship of tensile strength F (MPa) and elongation L (%) of L≧52−0.035×F.

6 Claims, No Drawings

HIGH STRENGTH GALVANNEALED STEEL SHEET EXCELLENT IN WORKABILITY AND A METHOD OF PRODUCTION OF THE SAME

TECHNICAL FIELD

The present invention relates to high strength galvannealed steel sheet and a method of production of the same, more particularly relates to a galvannealed steel sheet having excellent workability and able to be used for various applications such as steel sheet for building materials or for automobiles.

BACKGROUND ART

As coated steel sheet with a good corrosion resistance, there is galvannealed steel sheet. This galvannealed steel sheet is usually produced by degreasing the steel sheet, then preheating it in a nonoxidizing furnace, cleaning the surface, securing the desired quality by annealing it by reduction in a reducing furnace, dipping it in a hot-dip zinc bath, controlling the amount of deposition, then alloying it. This is characterized by excellent corrosion resistance and coating adhesion etc., so is being widely used for automotive and building material applications etc.

In particular, in recent years, in the automobile field, higher strength of coated-steel sheet has been considered necessary for securing the function of protecting the passengers against collisions and for reducing weight so as to improve the fuel efficiency.

To increase the strength of steel sheet without detracting from the workability, it is effective to add elements like Si or Mn and P, but addition of these elements delays the alloying, so compared with mild steel, a higher temperature and longer time are required for alloying. This higher temperature, longer alloying causes the austenite remaining in the steel sheet to transform to pearlite and reduces the workability, so as a result the effects of these added elements is canceled out. For the alloying of Si-containing high strength steel sheet, Japanese Unexamined Patent Publication (Kokai) No. 5-279829 discloses a method of production realizable even by a continuous hot-dip galvanizing line, but the range of the production conditions is described extremely broadly and this is of little use in actual production. Further, the method of production disclosed in Japanese Unexamined Patent Publication (Kokai) No. 11-131145 causes the formation of retained austenite by holding the sheet at a low temperature after coating, but this invites an increase in the facilities, so detracts from the productivity.

DISCLOSURE OF THE INVENTION

Therefore, the present invention solves the above problems and provides high strength galvannealed steel sheet excellent in workability and a method of high strength galvannealed steel sheet excellent in workability without installing new facilities.

The inventors engaged in intensive research on coating high strength steel sheet and as a result discovered that by coating steel to which C, Si, and Mn have been added in certain amounts or more by a continuous galvanizing facility optimized in heat treatment conditions and coating conditions, it is possible to produce high strength galvannealed steel sheet excellent in workability.

That is, the gist of the present invention is as follows:

(1) High strength galvannealed steel sheet excellent in workability, comprising high strength steel sheet containing, by mass %, C: 0.05 to 0.15%, Si: 0.3 to 2.0%, Mn: 1.0 to 2.8%, P: 0.03% or less, S: 0.02% or less, Al: 0.005 to 0.5%, and N: 0.0060% or less and a balance of Fe and unavoidable impurities, where, when % C, % Si, and % Mn respectively represent the C, Si, and Mn contents, (% Mn)/(% C)$\geq$12 and (% Si)/(% C)$\geq$4 being satisfied, on the surface of which having a galvannealing layer containing Al: 0.05 to 0.5 mass % and Fe: 5 to 15 mass % and a balance of Zn and unavoidable impurities, said steel sheet satisfying a relationship of tensile strength F (MPa) and elongation L (%) of L$\geq$52−0.035×F.

(2) A method of production of high strength galvannealed steel sheet excellent in workability comprising finish rolling a slab of a composition of chemical ingredients as set forth in (1) at a temperature of at least an $Ar_3$ point, cold rolling it by 50 to 85%, then annealing it in a continuous hot dip galvanizing facility in the 700° C. to 850° C. ferrite and austenite two-phase temperature region, cooling it from its maximum peak temperature to 650° C. by an average cooling rate of 0.5 to 10° C./sec, then from 650° C. to 500° C. by an average cooling rate of 3° C./sec or more, holding it from 500° C. to the coating bath for 30 seconds to 240 seconds, then galvanizing coating it so as to form on the surface of said cold rolled steel sheet a hot-dip galvanizing layer, then alloying said steel sheet formed with said galvanizing layer so as to produce a galvannealed steel sheet comprised of said steel sheet formed on its surface with a galvannealing layer, said method of production of high strength galvannealed steel sheet excellent in workability characterized by performing said hot-dip galvanizing in a hot-dip galvanizing bath of a composition of ingredients comprised of an effective Al concentration in the bath of 0.07 to 0.105 wt % and a balance of Zn and unavoidable impurities and performing said alloying at a temperature T (° C.) satisfying:

$$225+2500\times[Al\%]\leq T\leq 295+2500\times[Al\%],$$

where, [Al %]: effective Al concentration in bath in zinc coating bath (wt %).

(3) A method of production of high strength galvannealed steel sheet excellent in workability as set forth in (2), said method of production of high strength galvannealed steel sheet characterized by being performed at an effective Al concentration in the bath satisfying $$[Al\%]\leq 0.103-0.008\times[Si\%]$$

where [Si %]: Si content in steel sheet (wt %)

(4) A method of production of high strength galvannealed steel sheet excellent in workability as set forth in any one of (2) to (3), said method of production of high strength galvannealed steel sheet characterized by making a time after hot dip coating until cooling to 400° C. or less 10 seconds to 100 seconds.

(5) A method of production of high strength galvannealed steel sheet excellent in workability as set forth in any one of (2) to (4), said method of production of high strength galvannealed steel sheet characterized by making the temperature of the hot-dip galvanizing bath less than 460° C.

(6) A method of production of high strength galvannealed steel sheet excellent in workability as set forth in any one of (2) to (5), said method of production of high strength galvannealed steel sheet characterized by annealing the sheet, then cooling it to 450° C. or less, then reheating it to a temperature over 450° C. and hot-dip galvanizing it.

BEST MODE FOR WORKING THE INVENTION

Below, the present invention will be explained in detail.
First, the reasons for the numerical limitations of C, Si, Mn, P, 0, Al, and N will be explained.

C is an element essential for trying to increase the strength of steel sheet by strengthening the structure by martensite or residual austenite. The reason for making the content of C 0.05% or more is that if C is less than 0.05%, in a hot-dip galvanizing line where rapid cooling from the annealing temperature using mist or sprayed water as a cooling medium is difficult, cementite or pearlite easily forms and securing the required tensile strength becomes difficult. On the other hand, the reason for making the content of C 0.15% or less is that if C exceeds 0.15%, formation of a sound weld zone by spot welding becomes difficult and simultaneously segregation of C becomes remarkable, so the workability is degraded.

Si is an element increasing the strength without greatly impairing the workability, in particular the elongation, of the steel sheet, and is added in an amount of 0.3 to 2.0% or, in terms of wt %, at least four times the C content. The reason for making the content of Si at least 0.3% is that if Si is less than 0.3%, securing the necessary tensile strength is difficult. The reason for making the Si content 2.0% or less is that if Si is over 2.0%, the effect of increasing the strength becomes saturated and a drop in ductility occurs. Further, by making the wt % at least four times the C content, the progression in the pearlite and bainite transformations in the reheating for the alloying treatment performed right after coating is remarkably retarded. Even after cooling down to room temperature, it is possible to obtain a microstructure in which by vol %, 3 to 20% of martensite and retained austenite are mixed in the ferrite.

Mn, along with C, lowers the free energy of austenite, so is added in an amount of 1.0% or more for the purpose of stabilizing the austenite until dipping the steel strip in the coating bath. Further, by adding it by a wt % at least 12 times the C content, the reheating for the alloying treatment performed right after dipping remarkably delays the progression of the pearlite and bainite transformation and results in a metal structure where, even after cooling down to room temperature, 3 to 20% of martensite and retained austenite in volume ratio are mixed in the ferrite. However, if the amount of addition becomes excessively large, the slab easily cracks and the spot weldability also deteriorates, so 2.8% is made the upper limit.

P is generally contained in steel as an unavoidable impurity, but if the amount exceeds 0.03%, the deterioration of the spot weldability becomes serious. Further, in high strength steel sheet such as in the present invention where the tensile strength exceeds 490 MPa, the toughness and the cold rollability both seriously deteriorate, so the content is made 0.03% or less. S is also generally contained in steel as an unavoidable impurity, but if its amount exceeds 0.02%, the presence of MnS stretched in the rolling direction becomes marked and has a detrimental effect on the bendability of the steel sheet, so the content is made 0.02% or less.

Al acts as a deoxidizing element for steel. Further, AlN makes the grain size of the hot rolled material finer and suppresses the coarsening of the crystal grains in the series of heat treatment processes so as to improve the quality of the material, so Al has to be added in an amount of 0.005% or more. However, if over 0.5%, not only does the cost rise, but also the surface properties deteriorate, so the content is made 0.5% or less. N is generally contained in steel as an unavoidable impurity, but if the amount exceeds 0.006%, the elongation and embrittlement both deteriorate, so the content is made 0.006% or less.

Further, the steel having these as its main ingredients may contain Nb, Ti, B, Mo, Cu, Sn, Zn, Zr, W, Cr, Ni, Co, Ca, rare earth elements (including Y), V, Ta, Hf, Pb, Mg, As, Sb, and Bi in a total amount of 1% or less without detracting from the effect of the present invention. Depending on the amounts, the corrosion resistance and workability will be improved or other desirable results obtained.

Next, the galvannealing layer will be explained.

The reason for limiting the Al composition in the galvannealing layer in the present invention to 0.05 to 0.5 mass % is that if less than 0.05 mass %, the Zn—Fe alloying proceeds too far at the time of alloying, a brittle alloy layer develops too much at the iron interface, and the coating adhesion deteriorates, while if over 0.5 mass %, the Fe—Al—Zn-based barrier layer is formed too thickly and alloying does not proceed at the time of the alloying, so a coating with the targeted iron content cannot be obtained.

Further, the reason for limiting the Fe composition to 5 to 15 mass % is that if less than 5 mass %, the coating surface is formed with a soft Zn—Fe alloy which degrades the press formability, while if over 15 mass %, a brittle alloy layer develops too much at the iron interface, and the coating adhesion deteriorates. Preferably, the content is 7 to 13 mass %.

The steel sheet of the present invention may also contain or include mixed in the hot-dip galvanizing bath or galvanizing coating one or more of Pb, Sb, Si, Sn, Mg, Mn, Ni, Cr, Co, Ca, Cu, Li, Ti, Be, Bi, and rare earth elements without detracting from the effect of the present invention. Depending on the amounts, the corrosion resistance or workability is improved etc. in good cases. The coating deposition of the galvannealed coating is not particularly limited, but from the viewpoint of the corrosion resistance, 20 g/m$^2$ or more is preferable, while from the viewpoint of economy, 150 g/m$^2$ or less is preferable.

The "high strength galvannealed steel sheet excellent in workability" in the present invention means steel sheet having a performance of a tensile strength TS of 490 MPa or more and a relationship of the tensile strength F (MPa) and elongation L (%) satisfying $L \geq 52-0.035 \times F$.

The reason for limiting the elongation L to $[52-0.035 \times F]\%$ or more is that if L is lower than $[52-0.035 \times F]$, the sheet will break at the time of deep drawing or other severe working and the workability will otherwise become insufficient.

Next, the reasons for limitation of the production conditions will be explained.

The object lies in obtaining a microstructure including martensite and retained austenite in an amount of 3 to 20% and achieving both a high strength and good press workability. If the volume ratio of martensite and retained austenite is less than 3%, a high strength will not be obtained. On the other hand, if the volume ratio of martensite and retained austenite exceeds 20%, while the strength will be high, the workability of the steel sheet will deteriorate and the object of the present invention will not be achieved.

The slab used for the hot rolling is not particularly limited, but a continuous casting slab or a slab produced by a thin slab caster etc. may be used. A process such as "continuous casting to direct rolling (CC to DR)" performing the hot rolling right after casting is also met with.

The finish temperature of the hot rolling has to be made the $Ar_3$ point or more from the viewpoint of securing the press formability of the steel sheet. The cooling conditions after the hot rolling and the coiling temperature are not particularly limited, but the coiling temperature should not be one giving greater variation in quality at the two ends of the coil and should not be one causing deterioration of the pickling ability due to the increase of the scale thickness, so is made 750° C. or less. Further, if bainite or martensite is partially formed, edge cracks will easily occur at the time of cold rolling. In extreme cases, the sheet will even break. Therefore, 550° C. or more is preferable. The cold rolling may be performed under the usual conditions. The ferrite is made to be easily work hardened by finely dispersing martensite and retained austenite in it. For the purpose of obtaining the greatest improvement in the workability, the reduction ratio is made 50% or more. On the other hand, cold rolling by a reduction ratio of over 85% requires a massive cold rolling load, so is not realistic.

When annealing the sheet by an in-line annealing type continuous hot dip galvanizing facility, the annealing temperature is made the 700° C. to 850° C. region where the two phases of ferrite and austenite can coexist. If the annealing temperature is less than 700° C., the recrystallization is insufficient and the steel sheet cannot be provided with the necessary press workability. Annealing at a temperature over 850° C. results remarkable growth of an Si or Mn oxide layer at the steel strip surface and easily results in coating defects, so is not preferable. Further, in the process of dipping the sheet in the coating bath and cooling it, even if gradually cooling to 650° C., a sufficient volume ratio of ferrite will not be grown, the austenite will transform to martensite in the middle of cooling from 650° C. to the coating bath, the martensite will be tempered by the reheating for the later alloying and cementite will be precipitated, so achieving both high strength and good press workability will become difficult.

The steel strip is annealed, then cooled in the process of being dipped in the coating bath. The cooling rate in this case is an average 0.5 to 10° C./sec from its maximum peak temperature to 650° C. and an average cooling rate of 3° C./sec from 650° C. to 500° C. The strip is held from 500° C. to the coating bath for 30 seconds to 240 seconds, then dipped in the coating bath.

The rate until 650° C. is made an average 0.5 to 10° C./sec for the purpose of improving the workability by increasing the volume ratio of ferrite and simultaneously for increasing the C concentration of the austenite so as to lower the free energy produced and make the temperature of the start of the martensite transformation the coating bath temperature or less. To make the average cooling rate until 650° C. less than 0.5° C./sec, it is necessary to lengthen the line of the continuous hot-dip galvanizing facility which results in higher cost, so the average cooling rate until 650° C. is made 0.5° C./sec or more.

To make the average cooling rate until 650° C. less than 0.5° C./sec, it may be considered to lower the maximum peak temperature and anneal the strip at a temperature with a small volume ratio of austenite, but in this case the suitable temperature range becomes narrower than the temperature range allowed in actual operation. If the annealing temperature is low even a bit, no austenite will be formed and the object will not be achieved.

On the other hand, if the average cooling rate until 650° C. exceeds 10° C./sec, not only will the increase in the volume ratio of ferrite be insufficient, but also there will be little increase in the concentration of C in the austenite, so before the steel strip is dipped in the coating bath, part will transform to martensite. In the heating for the later alloying, the martensite will be tempered and precipitate as cementite, so achievement of both high strength and good workability will become difficult.

The average cooling rate from 650° C. to 500° C. is made 3° C./sec or more so as to avoid the austenite transforming to pearlite in the middle of the cooling. If the cooling rate is less than 3° C./sec, even if annealing at the temperature prescribed in the present invention or cooling to 650° C., pearlite will unavoidably be formed. The upper limit of the average cooling rate is not particularly limited, but cooling steel strip so that the average cooling rate exceeds 20° C./sec is difficult in a dry atmosphere.

The reason for holding the sheet from 500° C. to the coating bath for 30 seconds to 240 seconds is that if less than 30 seconds, the concentration of C in the austenite becomes insufficient and the concentration of C in the austenite will not reach the level enabling residual presence of austenite at room temperature, while if over 240 seconds, the bainite transformation will proceed too much, the amount of austenite will become smaller, and a sufficient amount of retained austenite will no longer be able to be formed.

Further, while holding from 500° C. to the coating bath, if once cooling to 450° C. or less and holding the sheet for 25 seconds or more, the concentration of C in the austenite will be promoted and a high strength galvannealed coating excellent in workability will be obtained. However, if dipping the sheet into a coating bath at 450° C. or less, the coating bath will be cooled and will solidify, so the sheet has to be reheated to a temperature of over 450° C., then coated by hot-dip galvanizing.

In the production of the galvannealed steel sheet according to the present invention, the hot-dip galvanizing coating bath used is adjusted to an Al concentration of an effective Al concentration C in the bath of 0.07 to 0.105 wt %. Here, the "effective Al concentration in the coating bath" is the value of the Al concentration in the bath minus the Fe concentration in the bath.

The reason for limiting the effective Al concentration to 0.07 to 0.105 wt. is that when the effective Al concentration is lower than 0.07%, the Fe—Al—Zn phase serving as an alloying barrier at the initial part of the coating is insufficiently formed and the brittle $\Gamma$ phase is formed thicker at the coating-steel sheet interface at the time of coating, so only galvannealed steel sheet inferior in coating adhesion at the time of working can be obtained. On the other hand, when the effective Al concentration is higher than 0.105%, high temperature, long period alloying becomes necessary and the austenite which had remained in the steel transforms to pearlite, so achievement of both high strength and workability becomes difficult.

Further, in the present invention, the alloying temperature at the time of alloying is made a temperature T(° C.) satisfying $225+2500\times[Al\%] \leq T \leq 295+2500\times[Al\%]$, where [Al %]: effective Al concentration (wt %) in bath in zinc coating bath.

The reason for limiting the alloying temperature T to [225+ 2500×[Al %]]° C. to [295+2500×[Al %]]° C. is that if the alloying temperature T is lower than [225+2500×[Al %]]° C., the alloying will not proceed or else the alloying will proceed insufficiently resulting in non-alloying and the coating surface layer being covered by a poor workability η phase or ζ phase. Further, if T is higher than [295+2500×[Al %]]° C., the alloying proceeds too much, the Fe % in the coating of the present invention is exceeded, and the coating adhesion at the time of working declines increasingly.

In the present invention, if the alloying temperature is too high, the austenite which had remained in the steel transforms to pearlite and the targeted steel sheet achieving both high strength and workability cannot be obtained. Therefore, the greater the amount of addition of Si and the harder the alloying, to improve the workability, it is effective to lower the effective Al concentration in the bath and lower the alloying temperature.

Specifically, the sheet is coated at an effective Al concentration (wt %) in the bath satisfying $[Al\%] \leq 0.103-0.008\times[Si\%]$, where [Si %]: Si content in steel sheet (wt %).

The reason for limiting the effective Al concentration to [0.103−0.008×[Si %]]% or less is that if the effective Al concentration is higher than [0.103−0.008×[Si %]]%, high temperature, long-period alloying becomes necessary, the austenite which had remained in the steel changes to pearlite, and the workability is degraded.

The reason for limiting the time from hot-dip galvanizing to cooling to a temperature of 400° C. or less to 10 seconds to 100 seconds is that if less than 10 seconds, the concentration of C in the austenite becomes insufficient and the concentration of C in the austenite will not reach a level enabling residual presence of austenite at room temperature, while if over 100 seconds, the bainite transformation will proceed to far, the amount of austenite will become smaller, and a sufficient amount of retained austenite will not be able to be formed. Preferably the time is 10 seconds to 30 seconds.

The heating method of the alloying furnace is not particularly limited in the present invention. So long as the temperature of the present invention can be secured, radiant heating by an ordinary gas furnace or high frequency induction heating are both possible. Further, the method of cooling from the maximum peak sheet temperature after heating for alloying is not an issue. So long as an air seal etc. is used to shield the heat after alloying, it is sufficient even to allow the sheet to stand in the open. Gas cleaning etc. for rapid cooling is also not a problem.

The reason for limiting the temperature of the hot-dip galvanizing bath to less than 460° C. is that if 460° r or more, the Fe—Al—Zn phase becoming an alloying barrier at the start of coating is formed too fast and raises the alloying temperature, so easily becomes a cause reducing the workability in types of steel with high amounts of addition of Si. The lower limit of the bath temperature is not particularly limited, but since the melting point of zinc is 419.47° C., hot-dip galvanizing coating is only physically possible at a bath temperature of at least that.

EXAMPLES

Below, examples will be used to explain the present invention in more detail.

Example 1

A slab of each of the compositions shown in Table 1 was heated to 1150° C., hot rolled at a finish temperature of 910 to 930° C. to a 4.5 mm hot rolled steel strip, and coiled at 580 to 680° C. This was pickled, then cold rolled to a 1.6 mm cold rolled steel strip, then heat treated and coated under the conditions shown in Table 2 using an in-line annealing type continuous hot dip galvanizing facility to produce galvannealed steel sheet.

The tensile strength (TS) and the elongation (El) were found by cutting out JIS No. 5 test pieces from the steel sheets and subjecting them to a tensile test at ordinary temperature. A tensile strength of 490 MPa or more was deemed passing, while an elongation of [52−0.035×tensile strength]% or more was deemed passing. The amounts of deposition of the coatings and the Fe and Al concentrations were found by dissolving the coatings by hydrochloric acid containing an inhibitor and measurement by ICP. An Fe concentration in the coating of 5 to 15% was deemed passing.

The results of the evaluation are as shown in Table 2. No. 1 had a C content in the steel outside the scope of the present invention, so the tensile strength was insufficient. No. 2 had an Si content in the steel outside the scope of the present invention, so the tensile strength and elongation both were substandard. No. 3 had a P content in the steel outside the scope of the present invention, so the elongation was substandard. Nos. 7, 8, and 17 had maximum peak temperatures at the time of annealing outside the scope of the present invention, so the elongations were substandard. No. 9 had an Mn content in the steel outside the scope of the present invention, so the tensile strength and elongation both were substandard. Nos. 12 and 29 had alloying temperatures outside the scope of the present invention, so the elongations were substandard. No 15 had an alloying temperature outside the scope of the present invention, so the Fe % in the coating was substandard. Nos. 20 and 30 had average cooling rates from the maximum peak temperature to 650° C. outside the scope of the present invention, so the elongations were substandard. No. 21 had a holding time from 500° C. to the coating bath outside the scope of the present invention, so the elongation were substandard. No. 26 had an Mn content/C content in the steel outside the scope of the present invention, so the elongation was substandard. No. 27 had an Si content/C content in the steel outside the scope of the present invention, so the elongation was substandard. No. 31 had an average cooling rate from 650° C. to 500° C. outside the scope of the present invention, so the elongation was substandard. No. 32 had an Mn content in the steel outside the scope of the present invention, so the elongation was substandard. No. 33 had a C-content in the steel outside the scope of the present invention, so the elongation was substandard. The products of the present invention other than these were high strength, excellent workability galvannealed steel sheet.

Further, with a coating bath temperature less than 460° C., without regard as to the Si content in the steel, high strength, excellent workability galvannealed steel sheet could be produced. On the other hand, at 470° C., in the case of the No. 5 low Si content or the No. 35 high Si content and low Fe %, production was possible, but if trying to raise the Fe % by the high Si content of No. 36, the alloying temperature has to be raised and as a result, the elongation becomes substandard.

TABLE 1

| Symbol | Chemical composition (mass %) | | | | | | | | |
| --- | --- | --- | --- | --- | --- | --- | --- | --- | --- |
| | C | Si | Mn | P | S | Al | N | % Mn/% C | % Si/% C |
| A | 0.02 | 0.73 | 1.87 | 0.006 | 0.004 | 0.045 | 0.0023 | 93.5 | 36.5 |
| B | 0.07 | 0.19 | 1.76 | 0.007 | 0.003 | 0.034 | 0.0031 | 25.1 | 2.7 |
| C | 0.07 | 0.39 | 2.21 | 0.036 | 0.002 | 0.040 | 0.0032 | 31.6 | 5.6 |
| D | 0.07 | 0.43 | 2.18 | 0.011 | 0.002 | 0.035 | 0.0028 | 31.1 | 6.1 |
| E | 0.07 | 0.64 | 0.95 | 0.009 | 0.004 | 0.029 | 0.0040 | 13.6 | 9.1 |
| F | 0.07 | 0.66 | 1.55 | 0.006 | 0.003 | 0.283 | 0.0026 | 22.1 | 9.4 |
| G | 0.07 | 0.71 | 2.08 | 0.004 | 0.002 | 0.031 | 0.0030 | 29.7 | 10.1 |
| H | 0.07 | 1.14 | 1.95 | 0.007 | 0.003 | 0.037 | 0.0027 | 27.9 | 16.3 |
| I | 0.08 | 1.65 | 1.80 | 0.008 | 0.003 | 0.027 | 0.0035 | 22.5 | 20.6 |

TABLE 1-continued

| Symbol | Chemical composition (mass %) | | | | | | | % Mn/% C | % Si/% C |
|---|---|---|---|---|---|---|---|---|---|
| | C | Si | Mn | P | S | Al | N | | |
| J | 0.10 | 0.69 | 2.32 | 0.009 | 0.004 | 0.044 | 0.0033 | 23.2 | 6.9 |
| K | 0.14 | 0.50 | 1.61 | 0.013 | 0.005 | 0.0038 | 0.0042 | <u>11.5</u> | 3.6 |
| L | 0.13 | 0.36 | 2.11 | 0.011 | 0.003 | 0.0026 | 0.0036 | 16.2 | <u>2.8</u> |
| M | 0.14 | 0.82 | 2.27 | 0.008 | 0.002 | 0.054 | 0.0034 | 16.2 | 5.9 |
| N | 0.14 | 0.60 | <u>2.90</u> | 0.016 | 0.005 | 0.028 | 0.0045 | 20.7 | 4.3 |
| O | <u>0.18</u> | 0.94 | 2.77 | 0.018 | 0.004 | 0.037 | 0.0039 | 15.4 | 5.2 |
| P | 0.08 | 1.83 | 2.35 | 0.004 | 0.005 | 0.063 | 0.0030 | 29.4 | 22.9 |
| Q | 0.09 | 1.78 | 1.13 | 0.008 | 0.001 | 0.29 | 0.0027 | 12.6 | 19.8 |

Underlines indicate outside scope of present invention

TABLE 2

| Sample no. | Steel sheet no. | Max. peak temp. at annealing (° C.) | Average cooling rate to 650° C. (° C./s) | Average cooling rate to 500° C. (° C./s) | Holding time 500° C. to to coating bath (s) | Effective Al concentration (%) | Bath temp. (° C.) | Alloying temp. (° C.) |
|---|---|---|---|---|---|---|---|---|
| 1 | A | 770 | 5 | 15 | 5 | 0.095 | 450 | 490 |
| 2 | B | 760 | 2 | 8 | 10 | 0.1 | 450 | 500 |
| 3 | C | 760 | 4 | 10 | 10 | 0.095 | 450 | 490 |
| 4 | D | 760 | 2 | 8 | 30 | 0.095 | 450 | 490 |
| 5 | D | 760 | 2 | 8 | 30 | 0.095 | 470 | 490 |
| 6 | D | 760 | 2 | 8 | 30 | 0.095 | 440 | 490 |
| 7 | D | 660 | 2 | 8 | 30 | 0.095 | 450 | 490 |
| 8 | D | 860 | 2 | 8 | 30 | 0.095 | 450 | 490 |
| 9 | E | 780 | 3 | 15 | 20 | 0.095 | 450 | 490 |
| 10 | F | 780 | 3 | 10 | 40 | 0.095 | 450 | 490 |
| 11 | F | 780 | 3 | 10 | 40 | 0.095 | 450 | 525 |
| 12 | F | 800 | 3 | 6 | 30 | 0.095 | 450 | 550 |
| 13 | G | 770 | 1 | 6 | 35 | 0.095 | 450 | 490 |
| 14 | G | 830 | 1 | 6 | 35 | 0.095 | 450 | 465 |
| 15 | G | 830 | 1 | 6 | 35 | 0.095 | 450 | 450 |
| 16 | G | 830 | 1 | 6 | 35 | 0.095 | 450 | 490 |
| 17 | G | 890 | 2 | 8 | 30 | 0.095 | 450 | 490 |
| 18 | H | 780 | 2 | 7 | 30 | 0.09 | 450 | 490 |
| 19 | H | 820 | 1 | 4 | 30 | 0.09 | 450 | 490 |
| 20 | H | 820 | 15 | 18 | 5 | 0.09 | 450 | 490 |
| 21 | H | 820 | 1 | 4 | 20 | 0.09 | 450 | 490 |
| 22 | H | 820 | 1 | 4 | 150 | 0.09 | 450 | 470 |
| 23 | I | 800 | 2 | 4 | 35 | 0.085 | 450 | 500 |
| 24 | J | 770 | 0.8 | 3 | 50 | 0.095 | 450 | 490 |
| 25 | J | 770 | 0.8 | 3 | 50 | 0.095 | 450 | 465 |
| 26 | K | 790 | 2 | 4 | 30 | 0.095 | 450 | 490 |
| 27 | L | 760 | 2 | 10 | 30 | 0.095 | 450 | 490 |
| 28 | M | 770 | 3 | 12 | 30 | 0.095 | 450 | 490 |
| 29 | M | 770 | 3 | 12 | 30 | 0.095 | 450 | 550 |
| 30 | M | 770 | 0.3 | 15 | 30 | 0.095 | 450 | 490 |
| 31 | M | 770 | 5 | 1 | 90 | 0.095 | 450 | 490 |
| 32 | N | 760 | 2 | 4 | 30 | 0.095 | 450 | 490 |
| 33 | O | 770 | 2 | 4 | 30 | 0.095 | 450 | 500 |
| 34 | P | 830 | 2 | 4 | 30 | 0.085 | 450 | 500 |
| 35 | P | 830 | 2 | 4 | 30 | 0.085 | 470 | 500 |
| 36 | P | 830 | 2 | 4 | 30 | 0.085 | 470 | 520 |
| 37 | Q | 830 | 2 | 4 | 30 | 0.085 | 450 | 500 |

| Sample no. | Time to 400° C. (s) | Tensile strength (MPa) | Elongation (%) | Coating composition | | Coat. deposition (g/m²) | Remarks |
|---|---|---|---|---|---|---|---|
| | | | | Al % | Fe % | | |
| 1 | 60 | 423 | 38 | 0.3 | 10.2 | 36 | Comp. |
| 2 | 60 | 459 | 34 | 0.3 | 11.5 | 35 | " |
| 3 | 60 | 630 | 28 | 0.3 | 10.8 | 35 | " |
| 4 | 60 | 597 | 35 | 0.3 | 10.4 | 37 | Inv. |
| 5 | 60 | 596 | 35 | 0.3 | 10.5 | 35 | " |
| 6 | 60 | 597 | 35 | 0.3 | 10.5 | 38 | " |
| 7 | 60 | 967 | 5 | 0.3 | 10.6 | 36 | Comp. |
| 8 | 60 | 566 | 10 | 0.3 | 10.5 | 38 | " |
| 9 | 60 | 431 | 35 | 0.3 | 10.3 | 40 | " |
| 10 | 60 | 543 | 38 | 0.3 | 10.2 | 35 | Inv. |
| 11 | 50 | 522 | 35 | 0.3 | 11.5 | 37 | " |
| 12 | 50 | 516 | 26 | 0.3 | 12.3 | 38 | Comp. |
| 13 | 60 | 595 | 36 | 0.3 | 9.8 | 40 | Inv. |

TABLE 2-continued

| | | | | | | | |
|---|---|---|---|---|---|---|---|
| 14 | 70 | 734 | 28 | 0.3 | 7.6 | 36 | " |
| 15 | 80 | 751 | 30 | 0.3 | 4.9 | 38 | Comp. |
| 16 | 60 | 711 | 31 | 0.3 | 10 | 37 | Inv. |
| 17 | 60 | 713 | 17 | 0.3 | 9.8 | 39 | Comp. |
| 18 | 60 | 600 | 37 | 0.3 | 9.7 | 35 | Inv. |
| 19 | 60 | 611 | 36 | 0.3 | 9.9 | 36 | " |
| 20 | 60 | 718 | 14 | 0.3 | 9.6 | 39 | Comp. |
| 21 | 60 | 604 | 30 | 0.3 | 10 | 36 | " |
| 22 | 80 | 627 | 39 | 0.3 | 8.9 | 36 | Inv. |
| 23 | 60 | 620 | 35 | 0.3 | 9.3 | 37 | " |
| 24 | 60 | 777 | 29 | 0.3 | 9.7 | 38 | " |
| 25 | 70 | 770 | 27 | 0.3 | 7.9 | 35 | " |
| 26 | 60 | 627 | 26 | 0.3 | 10.3 | 37 | Comp. |
| 27 | 60 | 683 | 22 | 0.3 | 10.6 | 36 | " |
| 28 | 60 | 828 | 27 | 0.3 | 10.3 | 39 | Inv. |
| 29 | 50 | 670 | 18 | 0.3 | 11.9 | 41 | Comp. |
| 30 | 60 | 695 | 18 | 0.3 | 10.2 | 38 | " |
| 31 | 60 | 645 | 19 | 0.3 | 10.4 | 35 | " |
| 32 | 60 | 987 | 12 | 0.3 | 9.9 | 36 | " |
| 33 | 60 | 1120 | 8 | 0.3 | 9.5 | 36 | " |
| 34 | 60 | 875 | 27 | 0.3 | 8.4 | 37 | Inv. |
| 35 | 60 | 875 | 27 | 0.3 | 6.9 | 38 | " |
| 36 | 60 | 798 | 21 | 0.3 | 8.1 | 38 | Comp. |
| 37 | 60 | 783 | 27 | 0.3 | 8.6 | 36 | Inv. |

Example 2

A slab comprised of the composition shown by H in Table 1 was heated to 1150° C., hot rolled at a finish temperature 910 to 930° C. to a 4.5 mm hot rolled steel strip, and coiled at 580 to 680° C. This was pickled, then cold rolled to a 1.6 mm cold rolled steel strip, then heat treated and coated under the conditions such as shown in Table 3 using an in-line annealing type continuous hot-dip galvanizing facility to produce a galvannealed steel sheet. The tensile strength (TS) and the elongation (El) were found by cutting out JIS No. 5 test pieces from the steel sheets and subjecting them to a tensile test at ordinary temperature. A tensile strength of 490 MPa or more was deemed passing, while an elongation of [52−0.035×tensile strength]% or more was deemed passing. The amounts of deposition of the coatings and the Fe and Al concentrations were found by dissolving, the coatings by hydrochloric acid containing an inhibitor and measurement by ICP. An Fe concentration in the coating of 5 to 15% was deemed passing.

The coating adhesion was found by bending a test piece, on which adhesive tape (cellophane tape) had been attached to the compression side in advance, by to a V-shape to give a bending angle of 600, bending it back, then-peeling off the adhesive tape, visually observing the degree of peeling of the coating, and evaluating it by the following classifications. "F" or better was deemed passing. "VG (very good)": peeled width of coating layer of less than 1 mm, "G (good)": peeled width of coating layer of 1 mm to less than 6 mm, "F (fair)": peeled width of coating layer of 6 mm to less than 12 mm, "P (poor)": peeled width of coating layer of 12 m or more.

The results of the evaluation are as shown in Table 3. No. 4 had an effective Al concentration in the coating bath outside the scope of the present invention, so the coating adhesion were substandard. No. 7 had an effective Al concentration in the coating bath outside the scope of the present invention, so the elongation was substandard. No. 8 had an effective Al concentration in the coating bath outside the scope of the present invention, so the Fe % in the coating was substandard. The products of the present invention other than these were high strength, excellent workability galvannealed steel sheet.

TABLE 3

| Sample no. | Steel sheet no. | Max. peak temp. at annealing (° C.) | Average cooling rate to 650° C. (° C./s) | Average cooling rate to 500° C. (° C./s) | Holding time 500° C. to coating bath (s) | Effective Al concentration (%) | Bath temp. (° C.) | Alloying temp. (° C.) |
|---|---|---|---|---|---|---|---|---|
| 1 | H | 820 | 1 | 4 | 30 | 0.09 | 450 | 490 |
| 2 | H | 820 | 1 | 4 | 30 | 0.08 | 450 | 470 |
| 3 | H | 820 | 1 | 4 | 30 | 0.07 | 450 | 460 |
| 4 | H | 820 | 1 | 4 | 30 | 0.065 | 450 | 450 |
| 5 | H | 820 | 1 | 4 | 30 | 0.1 | 450 | 490 |
| 6 | H | 820 | 1 | 4 | 30 | 0.1 | 450 | 510 |
| 7 | H | 820 | 1 | 4 | 30 | 0.11 | 450 | 530 |
| 8 | H | 820 | 1 | 4 | 30 | 0.11 | 450 | 510 |

| Sample no. | Time to 400° C. (s) | Tensile strength (MPa) | Elongation (%) | Coating composition Al % | Coating composition Fe % | Coat. deposition (g/m$^2$) | Coating adhesion | Remarks |
|---|---|---|---|---|---|---|---|---|
| 1 | 60 | 611 | 36 | 0.3 | 9.9 | 36 | G | Inv. |
| 2 | 60 | 615 | 37 | 0.3 | 10.9 | 36 | G | " |
| 3 | 70 | 622 | 38 | 0.3 | 12.1 | 35 | F | " |

TABLE 3-continued

| | | | | | | | | |
|---|---|---|---|---|---|---|---|---|
| 4 | 80 | 629 | 39 | 0.2 | 13.2 | 35 | P | Comp. |
| 5 | 60 | 612 | 36 | 0.3 | 6.7 | 37 | G | Inv. |
| 6 | 60 | 605 | 32 | 0.3 | 9.4 | 35 | G | " |
| 7 | 70 | 570 | 27 | 0.3 | 9.1 | 37 | G | Comp. |
| 8 | 70 | 604 | 32 | 0.3 | 4.7 | 36 | G | " |

INDUSTRIAL APPLICABILITY

As explained above, the present invention enables the provision of high strength galvannealed steel sheet excellent in workability and a method of production of the same.

The invention claimed is:

1. A method of production of high strength galvannealed steel sheet excellent in workability comprising:

finish rolling a slab containing, in mass, C: 0.05 to 0.15%, Si: 0.3 to 2.0%, Mn: 1.0 to 2.8%, P: 0.03% or less, S: 0.02% or less, Al: 0.005 to 0.5%, and N: 0.0060 or less, and a balance of Fe and unavoidable impurities where, when % C, % Si, and % Mn respectively represent the C, Si, and Mn contents, (% Mn)/(% C)$\geq$12 and (% Si)/(% C)$\geq$4 being satisfied, said finish rolling taking place at a temperature of at least an Ar3 point to provide a hot rolled steel sheet, cold rolling the hot rolled steel sheet by a reduction rate of 50 to 80%, then annealing the cold rolled steel sheet in a continuous hot-dip galvanizing facility in a 700° C. to 850° C. ferrite and austenite two-phase temperature region prior to hot-dip galvanizing, cooling the annealed steel sheet from its maximum peak temperature to 650° C. by an average cooling rate of 0.5 to 10° C./sec, then from 650° C. to 500° C. by an average cooling rate of 30° C./sec or more, holding the cooled annealed steel sheet in a temperature range of 500° C. to a hot-dip galvanizing bath temperature for 30 seconds to 240 seconds prior to hot-dip galvanizing in the hot-dip galvanizing bath, then hot-dip galvanizing said steel sheet in said hot-dip galvanizing bath so as to form on the surface of said cold rolled steel sheet a hot-dip galvanizing layer, then alloying said steel sheet with said hot-dip galvanizing layer so as to produce a galvannealed steel sheet comprised of said steel sheet having on its surface a galvannealed layer containing Al: 0.05 to 0.5 mass % and Fe: 5 to 15 mass % and a balance of Zn and unavoidable impurities, said steel sheet satisfying a relationship of tensile strength F (MPa) and elongation L(%) of L$\geq$52−0.035×F, said method of production of high strength galvannealed steel sheet excellent in workability further comprising performing said hot-dip galvanizing in a hot-dip galvanizing bath of a composition of ingredients comprised of an [Al %] concentration in the bath of 0.07 to 0.105 mass % and a balance of Zn and unavoidable impurities and performing said alloying at a temperature T (° C.) satisfying, 225+2500×[Al %]$\leq$T$\leq$295+2500×[Al %], where, [Al %]: effective Al concentration, in mass %, in said hot-dip galvanizing bath, effective Al concentration being the value of the Al concentration in said hot-dip galvanizing bath minus the Fe concentration in said hot-dip galvanizing bath.

2. A method of production of high strength galvannealed steel sheet excellent in workability according to claim 1, wherein [Al %] in the hot-dip galvanizing bath satisfies; [Al %]$\leq$0.103−0.008×[Si %], where, [Si %]: Si content in the steel sheet.

3. A method of production of high strength galvannealed steel sheet excellent in workability according to claim 1 or 2, wherein a time after hot-dip galvanizing coating until cooling to 400° C. or less is 10 seconds to 100 seconds.

4. A method of production of high strength galvannealed steel sheet excellent in workability according to claim 1 or 2, wherein the temperature of the hot-dip galvanizing bath is less than 460° C.

5. A method of production of high strength galvannealed steel sheet excellent in workability according to claim 1 or 2, wherein the annealed steel sheet is cooled to 450° C. or less, then the cooled steel sheet is reheated to said holding step temperature range and then the reheated steel sheet is hot-dip galvanized.

6. A method of production of high strength galvannealed steel sheet excellent in workability according to claim 1 or 2, comprising annealing the cold rolled steel sheet in a continuous hot-dip galvanizing facility in a 700° C. to 850° C. ferrite and austenite two-phase temperature region prior to hot-dip galvanizing, cooling the annealed steel sheet from its maximum peak temperature to 650° C. by an average cooling rate of 0.5 to 10° C./sec, then from 650° C. to 500° C. by an average cooling rate of 3° C./sec or more, holding the cooled annealed steel sheet at a temperature range from 500° C. to a hot-dip galvanizing bath temperature for 30 seconds to 240 seconds prior to hot-dip galvanizing in the hot-dip galvanizing bath, then further cooling the held steel sheet to below 450° C., and then reheating the cooled steel sheet to a temperature over 450° C., then hot-dip galvanizing said steel sheet in said hot-dip galvanizing bath.

* * * * *